US008605581B2

(12) United States Patent
Baeder et al.

(10) Patent No.: US 8,605,581 B2
(45) Date of Patent: Dec. 10, 2013

(54) METHOD AND APPARATUS FOR ASSIGNING TRANSCODING RESOURCES IN A SESSION BOARDER CONTROLLER

(75) Inventors: Rainer Baeder, Leinfelden-Echterdingen (DE); Hartmut Schmidt, Grossbottwar (DE)

(73) Assignee: Alcatel Lucent, Paris (FR)

( * ) Notice: Subject to any disclaimer, the term of this patent is extended or adjusted under 35 U.S.C. 154(b) by 1278 days.

(21) Appl. No.: 12/029,067

(22) Filed: Feb. 11, 2008

(65) Prior Publication Data

US 2008/0192760 A1    Aug. 14, 2008

(30) Foreign Application Priority Data

Feb. 12, 2007  (EP) ................................. 07300788

(51) Int. Cl.
*G01R 31/08* (2006.01)
(52) U.S. Cl.
USPC ......................................................... 370/230
(58) Field of Classification Search
USPC ......................................... 370/230, 252, 352
See application file for complete search history.

(56) References Cited

U.S. PATENT DOCUMENTS

| | | | | |
|---|---|---|---|---|
| 4,511,762 A * | 4/1985 | Stockdale | ...................... | 379/279 |
| 6,888,477 B2 * | 5/2005 | Lai et al. | ......................... | 341/50 |
| 2002/0067710 A1 | 6/2002 | Helm | | |
| 2003/0135376 A1 * | 7/2003 | Harada | ......................... | 704/275 |
| 2004/0267882 A1 | 12/2004 | Whynot | | |
| 2005/0013281 A1 | 1/2005 | Milton | | |
| 2005/0074017 A1 | 4/2005 | Qian | | |
| 2005/0180397 A1 * | 8/2005 | Yeom | .............................. | 370/352 |

OTHER PUBLICATIONS

"Gateway control protocol: Media gateway overload control package", ITU-T Standard in Force (I), International Telecommunication Union, Geneva, CH, No. H24811 11/2, Nov. 29, 2002, XP017401370.

* cited by examiner

*Primary Examiner* — Mark Rinehart
*Assistant Examiner* — Mohammad Anwar
(74) *Attorney, Agent, or Firm* — Harness, Dickey & Pierce, P.L.C.

(57) ABSTRACT

A session boarder controller (4, 5; 20) is use between peering networks (1, 2, 3) supporting packetized voice transport. In order to save expensive DSP resources, a dynamic transcoder resource management is proposed.
The session boarder controller contains:
  I/O means (21, 22) having an I/O capacity that corresponds to at least a predefined number of trunks;
  digital signal processing means (23a, 23b, 23c) adapted to convert between different type of voice codecs used for packetized voice transport in incoming or outgoing connections, said digital signal processing means (23a, 23b, 23c) having limited processing capacity; and
  control means (24) adapted to determine idle processing capacity of said digital signal processing means (23a, 23b, 23c) and to reject resource-consuming connections that require codec conversion, if the total amount of idle processing capacity would fall below a threshold that depends on the number of idle trunks.

10 Claims, 2 Drawing Sheets

METHOD AND APPARATUS FOR ASSIGNING TRANSCODING RESOURCES IN A SESSION BOARDER CONTROLLER

FIELD OF THE INVENTION

The invention is based on a priority application EP 07 300 788.2 which is hereby incorporated by reference.

The present invention relates to the field of telecommunications and more particularly to a method and related apparatus for assigning transcoding resources in a session boarder controller of a next generation network.

BACKGROUND OF THE INVENTION

The telecommunications industry is currently undergoing a transformation from a traditional circuit switched network, which was originally designed and optimized for carrying voice telephony traffic, to packet based networks which will be capable of efficiently supporting both voice and data communications.

A next generation network (NGN) is a packet-based network that employs new control, management, and signaling techniques to provide both narrow-band voice telephony services and broadband multimedia services.

NGNs have been described in several standardization bodies, defining network models and an architecture of the new network. These standardization bodies include 3GPP with IMS (IP Multimedia Subsystem), ETSI with TISPAN (Telecoms & Internet Converged Services & Protocols for Advanced Networks) and MFS who are defining the architectural aspects.

The general idea behind NGN is that all information is transmitted via packets, which are labeled according to their type (data, voice, etc) and handled differently for Quality of Service (QoS) and security purposes by traffic management equipment. Media gateways are devices, which are used at the boarder between an NGN and a PSTN (public switched telephone network).

In next generation networking, different protocols for voice transmission are in use today. These include G711, G729, G723, G726, and AMR (Adaptive Multi-Rate) and all use different voice codecs. At the interconnection point between different NGNs, gateways are hence required which perform transcoding to convert between different protocols used in the peering networks. Such gateways are commonly referred to as session boarder controllers (SBC). Standardization has divided the SBC into two part, ie a media SBC for traffic conversion and a signaling SBC for conversion of signaling protocols.

The conversion as such is typically carried out with the aid of Digital Signal Processors (DSPs). A DSP is a specialized microprocessor specifically designed for real-time digital signal processing. DSPs are however relatively expensive and will considerably increase the price of the media gateways. It is hence desirable to utilize DSP resources economically.

Today, existing gateways do either perform 100% transcoding as for example between mobile and fixed networks and are hence equipped with full 100% DSP capacity, or do not perform transcoding at all.

It might be desirable to provide a media session boarder controller with less than 100% transcoding capabilities. This can however lead to a situation where idle links are blocked when all installed DSP capacity is busy. In this case, no further service will be possible anymore, even service that would not require transcoding. This can be unacceptable in certain cases where for example peering network providers or customers have configured a number of links but the DSP resources are not able to process the amount of parallel sessions.

It is therefore an object of the present invention to provide a method and related media session boarder controller for a next generation network which does not require 100% transcoding resources but which avoids situations in which further service is blocked because of exhausted DSP resources.

SUMMARY OF THE INVENTION

These and other objects that appear below are achieved by a session boarder controller with dynamic transcoder resource management.

In particular for assigning transcoding resources in a session boarder controller the invention proposes the steps of:
  determining for an incoming call whether transcoding is required
  determining an amount of idle transcoding resources in said session boarder controller;
  determining a threshold value that depends on the number of idle trunks supported by said session boarder controller; and
  assigning transcoding resources to said incoming call if a remaining amount of idle transcoding resources is greater than said threshold value and rejecting said call otherwise.

The session boarder controller according to the invention contains:
  I/O means having an I/O capacity that corresponds to at least a predefined number of trunks;
  digital signal processing means adapted to convert between different type of voice codecs used for packetized voice transport in incoming or outgoing connections, said digital signal processing means having limited processing capacity; and
  control means adapted to determine idle processing capacity of said digital signal processing means and to reject resource-consuming connections that require codec conversion, if the total amount of idle processing capacity would fall below a threshold that depends on the number of idle trunks.

With this transcoder resource management function, the network transcoder resources can not be overbooked. This will prevent the network from blocking due to a lack of resources.

The dynamic transcoding management will lead to satisfied customers, knowing how to configure network interfaces with transcoding and what to negotiate with peering partners. The invention also provides significant advantages for reducing equipment costs for the expensive DSP resources.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
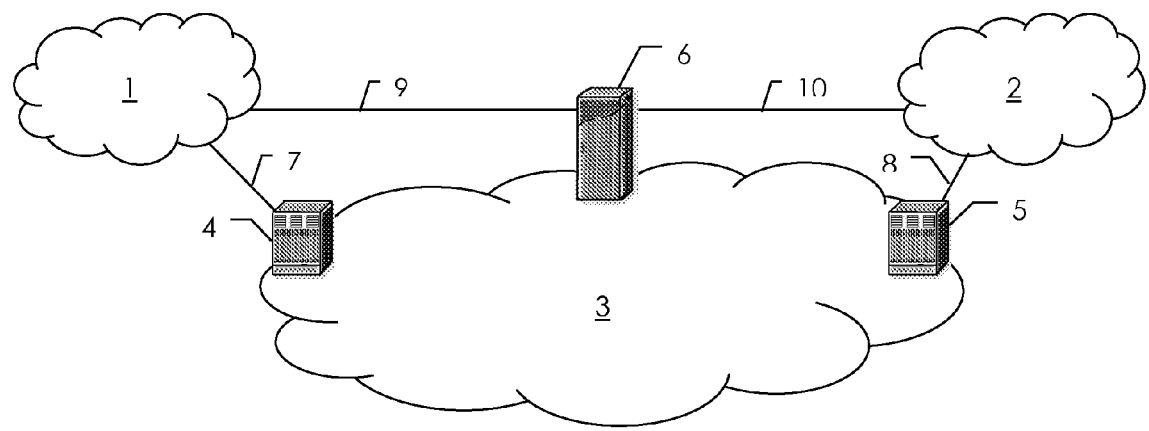
FIG. 1 shows an example next generation network where transcoding will be required.

A simplified network in which the invention can be applied is shown schematically in FIG. 1. A first carrier network 1 and a second carrier network 2 are interconnected through a third network 3. All three networks are next generation networks and support packetized transport of voice services using voice over IP (VoIP) technology or any other suitable packet format.

For the purpose of the present invention, the focus is on the functionality and abilities of network 3, which might be for example a backbone network of a national operator, while carrier networks 1 and 2 can be for example metro networks of local operators, so called Other Licensed Operators (OLOs), or private company networks.

A first media session boarder controller 4 connects network 1 to network 3 and a second media session boarder controller 5 connects network 2 to network 3. Signaling messages are routed to a signaling session boarder controller 6 in network 3. Signaling session boarder controllers are sometimes also referred to as softswitches. The signaling session boarder controller 6 selects a path for a connection to be established through network 3 and configures the media session boarder controllers 4 and 5 and other involved devices such as routers and switches along the selected path.

A suitable protocol for the transport of voice services through IP networks is for example the Real-Time Transport Protocol (RTP). Suitable signaling protocols that can be used for the communication with the signaling session boarder controller 6 include for example Megaco and SIP.

In order to transmit analog voice over a digital network the voice signal needs to be encoded into a data stream. Conversely, a corresponding decoding is necessary at the receiver side. This encoding and decoding process is referred to as codec. Sometimes the term codes is also used for device or algorithm that performs this encoding/decoding.

As mentioned above, a number of different codecs are in use today for digital telephony. The predominant codec in public switched telephone networks (PSTNs) is G711 but a variety of different codecs are in use for mobile communication and VoIP services in public and private networks.

According to the present invention, the media session boarder controllers 4 and 5 support at their interfaces 7 and 8 towards the customer networks 1 and 2 a set of different voice codecs, respectively. In the preferred embodiment, at least the codecs G711, G729, and G723 are supported.

Gateways 4 and 5 are hence equipped with DSPs, which can perform the conversion between different codecs. Such conversion between different voice codecs is also termed transcoding, and it is generally known in the art how to perform real time transconding of encoded voice data streams.

The gateways 4 and 5 are equipped with less than 100% DSP resources. In other words, they have less DSP resources than would be necessary to perform transcoding on all voice calls the gateway is able to handle at the same time.

The present invention hence proposes to introduce a control instance that keeps track of the DSP resources in a gateway and refuses resource-consuming connections that require transcoding, while preserving resources for less resource-consuming connections.

Figure 2:
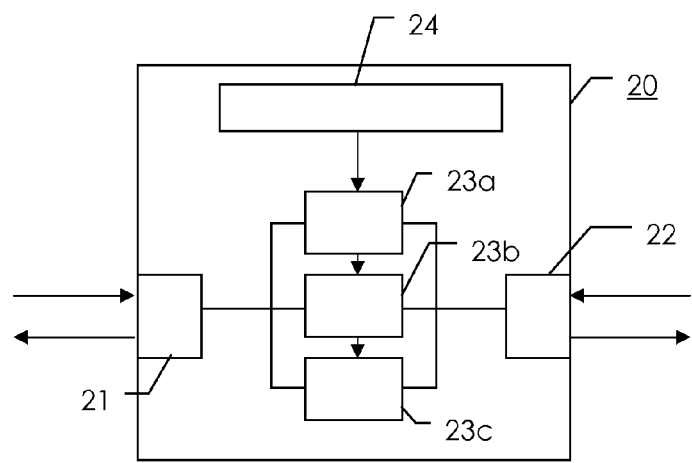
FIG. 2 shows a block diagram of a session boarder controller.

A block diagram of a media session boarder controller is shown in FIG. 2. The session boarder controller 20 has first interface 21 and a second interface 22 for connecting to a first and second network, respectively. These interfaces can for example be Gigabit Ethernet interfaces and can receive and transmit data traffic including hundreds of voice calls at a time as well as other type of media like video and multimedia.

A number of DSPs 23a, 23b, 23c are connected between the two interfaces 21, 22. The DSPs operate in parallel and are controlled by a controller 24. DSPs 23a, 23b, 23c are programmed to perform transcoding as well as other signal processing functions as may be required depending on the particular media type. It should be clear that a DSP can handle multiple voice calls in parallel, though the number of calls a DSP can handle depends on the transcoding operations it needs to carry out in each case.

The embodiment shows three DSPs operating in parallel on the received and transmitted data streams. These represent the available DSP resources. Controller 24 keeps track of the DSP resources and organizes which DSP handles which voice call.

It should be clear that the invention is not restricted to the use of three DSPs but can be carried out with a much higher number or even just with a single DSP.

Since the session boarder controller 20 has less DSP resources than would be required to perform transcoding on the maximum number of calls in parallel, the controller 24 provides dynamic resource management and refuses resource-consuming connections that require transcoding, if the total amount of idle processing capacity would fall below a certain threshold. This threshold is dynamic and depends on the number of calls served at the moment. At times when more calls are served by the gateway 20 and hence less free line capacity is available for further calls, the DSPs are certainly more busy and the threshold is hence set lower than at times when less calls are served.

In the preferred embodiment, two parameters are introduced: 1) the number trunks connected and 2) a measure for DSP resources, which is called "credits" hereinafter.

Each codec represents a certain predefined amount of credits it consumes when executed and each established connection reduces the total amount of idle DSP resources by the amount of credits that correspond to the codec used for this connection. Connections are refused if the total amount of idle resources would fall below a threshold that depends on the number of idle trunks.

In the embodiment, the media session boarder controller supports the codecs G711, G729, and G723. G711 corresponds to 1 credit; G729 corresponds to 3 credits and G723 corresponds to 4 credits.

It is assumed that the media session boarder controller is configured for 1000 trunks and that it has DSP resources corresponding to in total 1500 credits. Such figures can for example be agreed in a contract between the operators of the peering gateways and the media session boarder controller is hence dimensioned accordingly.

The rule according to which the controller assigns DSP resources and rejects connection requests is that connections are only allowed as long as the amount of credits left is greater or equal to the amount of idle trunks.

Under this rule, a carrier can use for example 200 connections with G729 codec. This will consume an amount of 200*3 credits=600 credits. The carrier has thus 900 credits left and 800 idle trunks.

The carrier might for example try to establish 300 connections with G729 codec. This would consume an amount of 300*3 credits=900 credits. The carrier has thus 600 credits left but 700 idle trunks. The number of idle trunks is hence higher than the amount of remaining credits. Since this violates the rule, the last connections will be rejected by the controller.

The same would happen if the carrier intends to establish 200 connections with G723 codec. The use of 200 channels with G723 would require 200*4 credits=800 credits, which would violate the rule: 800 trunks idle versus 600 remaining credits.

Trunks and credits are parameters that can be agreed by the peering network operators. The interface capacity and the DSP resources are carefully configured and part of the contract.

In such contract, also the rules according to which DSP resources are assigned and connection requests rejected can be agreed. For instance, an operator may wish to have as many connections accepted as he has credits. Under this circumstance, connections will not be refused as long as credits are available but at the price that idle trunks cannot be used because of exhausted credits.

It should be clear that the figures of credits and trunks as well as the rules are only non-limiting examples of the invention. Depending on the actual needs of the operators, many other rules can be chosen.

In a more general sense, the credit "prices" could be defined as follows:
- 0 credits: transparent, media agnostic connection where both peering carriers support the same codec. Media agnostic means here no detection and processing of media content will occur such as tone detection, comfort noise generation, fax demodulation (T.38) or the like.
- 1 credit: transparent, but media aware connection where both peering carriers support the same codec. DSP performs detection and/or processing functions on the media stream such as tone detection, silent suppression, comfort noise generation (voice only), fax demodulation (T.38), text over IP or others.
- >1 credits: transcoded connection where both peering carriers do not support the same codec. The price depends on the selected codec.

For media agnostic transparent connections, this would mean that such calls could be established even when no DSP resources are available any more.

Another remark is that the function of controller 24 be implemented in a media session boarder controller as it is shown for the sake of simplicity. Controller 24 will then be implemented in the internal host processor of a media session boarder controller 4, 5.

In an alternative embodiment, which is even preferred over the first alternative, controller functionality 24 can be implemented in a signaling session boarder controller controlling media session boarder controller 4,5, i.e. in softswitch 6 of FIG. 1.

Figure 3:
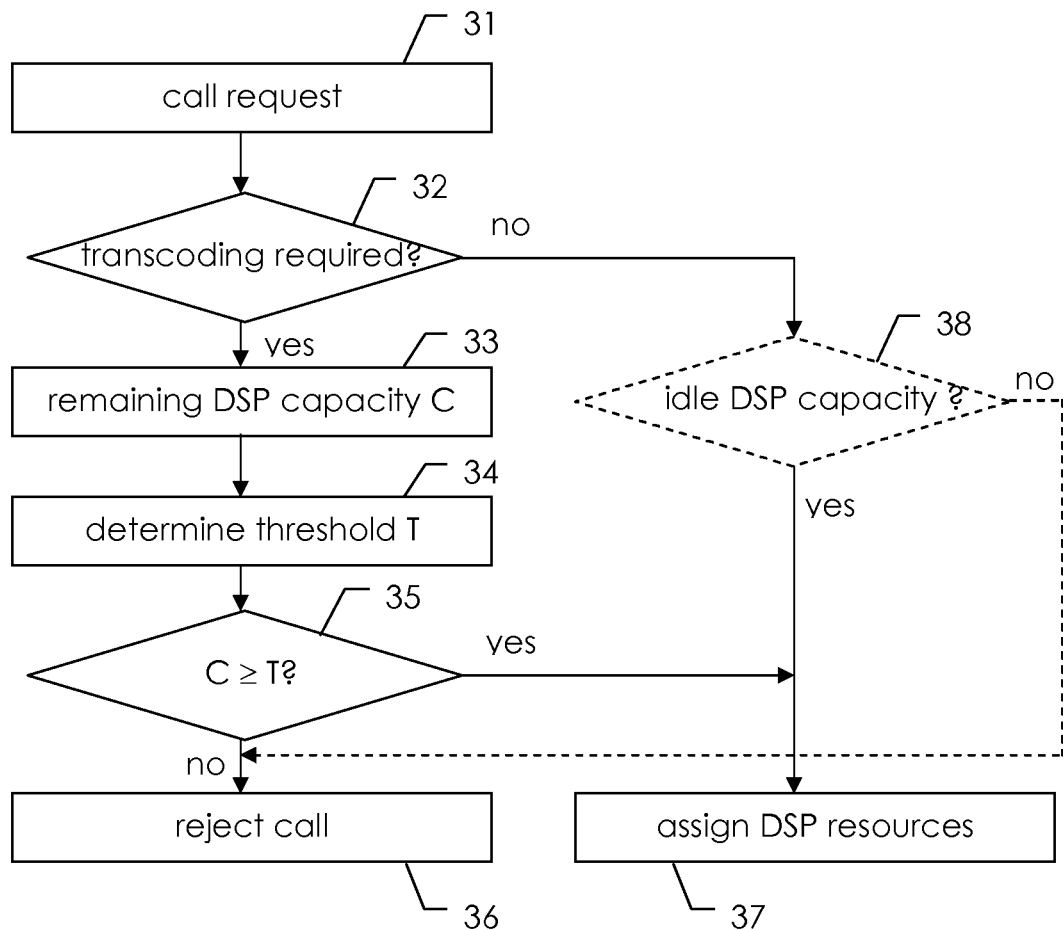
FIG. 3 shows a flow chart of the resource management function.

FIG. 3 shows a flow chart of a method for assigning resources in the session boarder controller 20.

In step 31 a call request for a voice call arises. For example an end used in network 1 places a call to an end user in network 3.

Step 32 determines whether the call coming from network 1 to gateway 7 requires transcoding.

If so, step 33 determines the DSP capacity in of gateway 4 that will remain if gateway 4 serves the call. This remaining capacity is denoted with C.

Step 34 determines a threshold value T, which depends on the number of idle trunks gateway 4 is designed to serve.

Step 35 determines whether the remaining capacity C is greater than or equal to the threshold value T.

If not, the call is rejected in step 36. If so, step 37 assigns the required DSP resources and routes the call through gateway 4 into network 3.

If the call requires no transcoding as determined in step 32, the call is also accepted and step 37 assigns the required DSP resources.

Optionally, a further check 38 can be introduced which determines whether idle credits are available. This step is optional, since depending on the rules used to determine the threshold value T, this situation can occur or not.

The invention claimed is:

1. A method of assigning transcoding resources in a network node interconnecting peering packet networks supporting packetized voice transport comprising:
   determining if transcoding is required for an incoming call;
   determining, in a network node, an amount of idle transcoding resources;
   determining a dynamic threshold value indicating a remaining number of idle trunks supported by the network node; and
   rejecting, transcoding resources to said incoming call at least based on said determined amount of idle transcoding resources and said dynamic-threshold value.

2. The method of claim 1, wherein said amount of idle transcoding resources is measured in arbitrary units, and wherein a plurality of codecs supported by said network node have assigned a certain amount of said units corresponding to the amount of idle transcoding resources said network node requires for processing.

3. The method of claim 1, wherein said dynamic threshold is chosen in such a way that it becomes smaller the more trunks are busy.

4. The method of claim 1, wherein said dynamic threshold is a linear function of the number of idle trunks.

5. A network node for use between peering networks supporting packetized voice transport, said network node comprising:
   an interface with an input/output capacity that corresponds with at least a number of trunks;
   a digital signal processor configured to convert a plurality of voice codecs used for packetized voice transport in incoming or outgoing connections; and
   a controller device configured to determine an idle processing capacity of said digital signal processor, and the controller device is further configured to reject resource-consuming connections that require a codec conversion based on the processing capacity of said digital signal processor and a dynamic threshold value, wherein the threshold value is indicates the number of idle trunks.

6. The network node of claim 5, wherein said digital signal processor is configured to support at least two of the list G711, G729, G723, G726, and AMR.

7. The network node of claim 5, wherein said interface and said digital signal processor are implemented in a media session boarder controller, and wherein said controller device is implemented in a separate signaling node configured to control said media session boarder controller.

8. The method of claim 1, wherein the network node is a session border controller.

9. The network node of claim 5, wherein the network node is a session border controller.

10. The network node of claim 5, wherein the dynamic threshold is chosen in such a way that it becomes smaller the more trunks are busy.

* * * * *